United States Patent Office 3,848,048
Patented Nov. 12, 1974

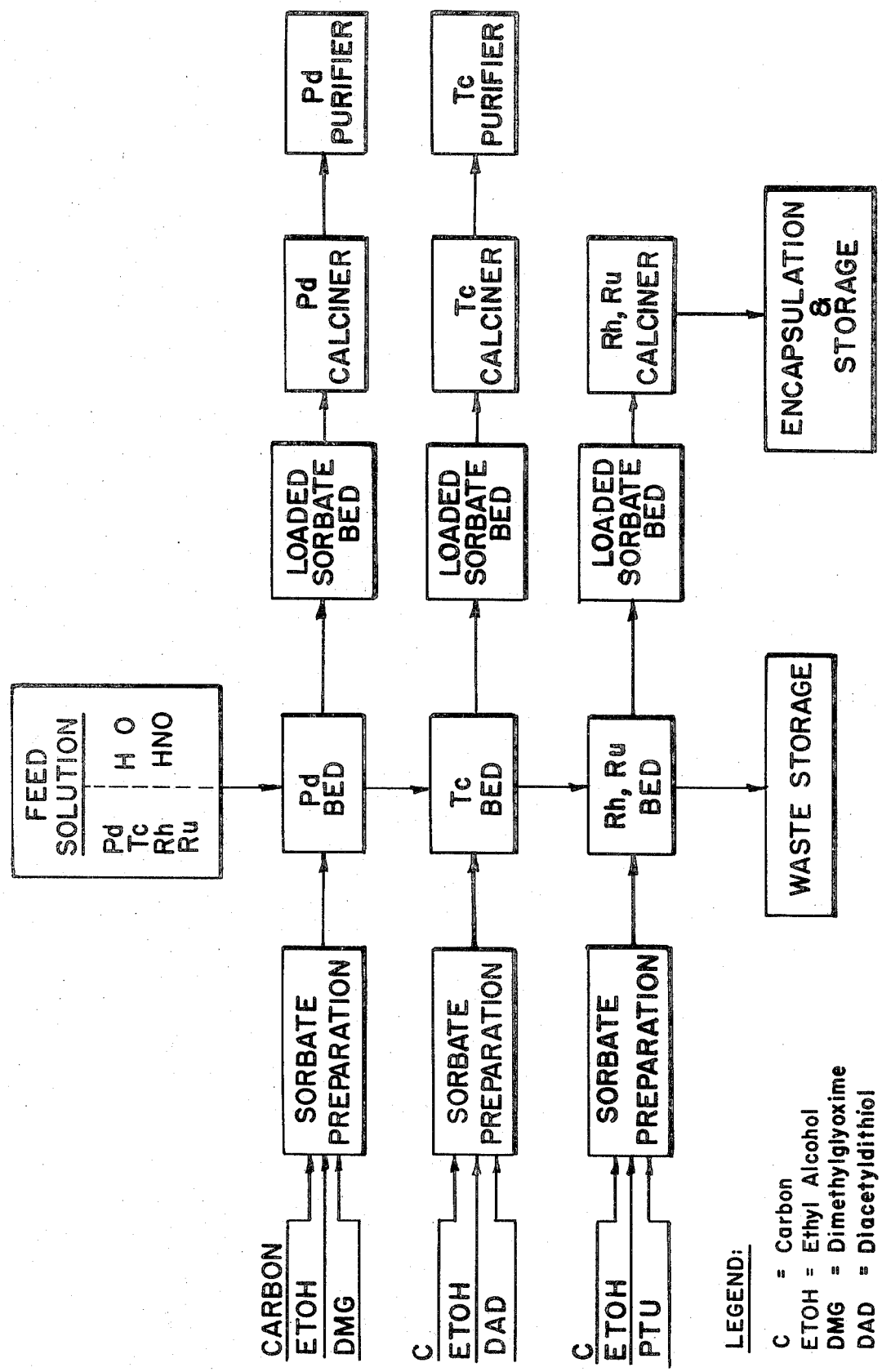

3,848,048
RECOVERY OF FISSION-PRODUCED TECHNETIUM, PALLADIUM, RHODIUM AND RUTHENIUM
Raymond H. Moore, Richland, Wash., assignor to the United States of America as represented by the United States Atomic Energy Commission
Filed July 12, 1973, Ser. No. 378,471
Int. Cl. C01g 55/00, 57/00
U.S. Cl. 423—22          5 Claims

ABSTRACT OF THE DISCLOSURE

The fission-produced technetium and the platinum metals, palladium, rhodium and ruthenium, are recovered from an aqueous acidic fuel reprocessing waste solution and separated from each other by contacting the waste solution sequentially with a series of beds of carbon, each bed having adsorbed thereon a different chelating agent specific for the metals to be recovered, whereby the metal ions are selectively chelated and removed from the waste solution.

CONTRACTURAL ORIGIN OF THE INVENTION

The invention described herein was made in the course of, or under, a contract with the United States Atomic Energy Commission.

BACKGROUND OF THE INVENTION

This invention relates to a method for the recovery and separation of some platinum metals and technetium from aqueous solutions. More specifically, this invention relates to a method for the recovery and separation of fission-produced palladium, technetium, rhodium and ruthenium from aqueous acidic fuel reprocessing waste solutions.

Fission products which result from the irradiation of nuclear reactor fuels are generally considered as harmful radioactive wastes which require storage in an insoluble form for centuries. Some of these wastes contain metals (rhodium, palladium, and ruthenium) which, when considered in the context of an ever increasing demand for these metals and their finite and diminishing reserves, become potential resources.

The recent decisions by U.S. automobile manufacturers to use platinum-metals-based catalyst systems will markedly increase the demand for these metals. Although previous systems for air pollution control have been platinum based, there is some indication that other platinum metals may be used in conjunction with platinum. Palladium has found general use as an electrical contact metal and as a catalyst for various chemical manufacture and purification processes. Rhodium, likewise, has been used with other metals as a catalyst in various chemical manufacture processes and in electrical contacts. Increasingly large amounts of ruthenium have also been used in the electrical and chemical industries during recent years.

Any of the fission products which result from the radiation of uranium and plutonium in nuclear reactors may be an important source of elements in the future. These elements may exist as stable elements such as those found in nature, e.g., barium, lanthanum, praseodymium and neodymium, or they may be some of the highly radioactive, unique and potentially useful fission products such as strontium-90, americium and cerium. Others of these isotopes may include some of the platinum metals such as palladium, rhodium and ruthenium in addition to technetium for which there is no known natural supply. While the demand for some of these elements is increasing, the natural reserves for these elements are shrinking. The recovery of some of these fission product elements may be an important natural resource in the years to come.

Technetium and the platinum group metals, ruthenium, rhodium and palladium, are produced in fairly high yield in nuclear reactors. Technetium is nonexistent in nature and may have properties of value which warrant its recovery. The platinum metals are of high intrinsic value and should be recovered to supplement waning natural resources.

The projected annual availability of technetium and the platinum group metals is given in Table I below:

TABLE I

Annual Availability of Fission Product Pd, Rh, Ru and Tc in ($10^3$) Troy oz./yr.[a]

|  | Pd | Rh | Ru | Tc |
|---|---|---|---|---|
| 1970 | 0.77 | 0.51 | 2.3 | 0.93 |
| 1975 | 22–23 | 13–14 | 61–67 | 25–27 |
| 1980 | 55–75 | 30–42 | 145–201 | 57–70 |
| 1985 | 115–170 | 64–95 | 302–450 | 119–178 |
| 1990 | 214–328 | 110–176 | 524–801 | 204–311 |

[a] The ranges given reflect the differences obtained from the differen types of reactors.

Technetium is present in fission product wastes as $^{99}$Tc. Palladium is present as stable isotopes containing about 15.7 atom percent $^{107}$Pd of long half-life but low energy ($\sim$.04 mev.). This low energy radiationo together with the biological inertness of palladium suggest this material can be utilized without regard to the presence of $^{107}$Pd.

Stable $^{103}$Rh is produced in fairly high yield (2.9% from $^{235}$U and 5.6% from $^{239}$Pu). All other isotopes produced have half-lives of a few seconds to a maximum of 36 hours and rapidly decay away. However, three isotopes are produced by $(n, 2n)$ and $(n, 3n)$ reactions with $^{103}$Rh which have appreciable half-lives and energetic beta and gamma emissions. These are $^{102}$Rh ($t\frac{1}{2}$=206 days), and $^{102}$Rh ($t\frac{1}{2}$=2.9 years), and $^{101}$Rh ($t\frac{1}{2}$=3.3 years). The latter forms via a rather improbable route and can probably be neglected. Before reactor-produced rhodium can be utilized in normal channels of commerce, it will have to be stored for a sufficient period to permit decay of these isotopes to inconsequential levels of activity (e.g. 30–50 years).

The stable isotopes of ruthenium are accompanied by radioactive isotopes of which $^{106}$Ru ($t\frac{1}{2}$=1.0 year) is the only one with a half-life long enough to cause a problem. As with rhodium, ruthenium must also be stored to permit decay of $^{106}$Ru (e.g. for 30 years).

SUMMARY OF THE INVENTION

A process has been developed by which fission-produced technetium and the platinum group metals, palladium, rhodium and ruthenium can be recovered from the aqueous acidic fuel reprocessing waste solutions and, in general, separated from each other.

In the method of this invention for recovering palladium, technetium and rhodium and ruthenium values from an aqueous acid solution and separating them from each other by contacting an aqueous acid feed solution containing these and other fission product values with a first bed of carbon, said first bed having adsorbed thereon a chelating agent which is specific for palladium, whereby the palladium in the feed solution is chelated and is retained on the first bed, contacting the feed solution with a second bed of carbon, said second bed having adsorbed thereon a chelating agent which is specific for technetium, whereby the technetium is chelated and is retained on the second bed, and contacting the feed solution with a third bed of carbon, said third bed having adsorbed thereon a chelating agent specific for rhodium and ruthenium, whereby the rhodium and ruthenium are chelated and are retained on the third bed, whereby the values are recovered from the acid feed solution and separated from each other.

It is therefore one object of the invention to provide a method for recovering palladium, technetium, rhodium and ruthenium values from an aqueous acid solution.

It is another object of the invention to provide a method for recovering palladium, technetium, rhodium and ruthenium values from an aqueous acid nuclear fuel reprocessing waste solution.

Finally, it is the object of the invention to provide a method for recovering palladium, technetium, rhodium and ruthenium values from an aqueous acid nuclear fuel reprocessing waste solution and separating the palladium, technetium, and rhodium and ruthenium values from each other.

BRIEF DESCRIPTION OF THE DRAWING

The drawing is a simplified flow diagram of the method of the invention.

DESCRIPTION OF THE PREFERRED EMBODIMENT

These and other objects of the invention may be met by contacting the aqueous nitric acid feed solution containing the palladium, technetium, rhodium and ruthenium and other fission product values with a first bed of carbon, said first bed having adsorbed thereon 20 to 25 w/o (weight percent) dimethylglyoxime (hereinafter referred to as DMG) whereby the palladium contained in the feed solution is cheleated by the DMG and remains on the first bed, contacting the feed solution with a second bed of carbon, said second bed having adsorbed thereon 20 to 25 w/o diacetyldithiol (hereinafter referred to as DAD) whereby the technetium is chelated by the DAD and remains on the second bed and contacting the feed solution with a third bed of carbon, said third bed having adsorbed thereon 20 to 25 w/o phenylthiourea (hereinafter referred to as PTU) whereby the rhodium and ruthenium are chelated and remain on the third bed, thereby recovering the palladium, technetium and rhodium and ruthenium values from the acid feed solution and separating the values from each other.

The feed solution may be any aqueous acid solution containing the values to be recovered. The process of the invention was developed specifically for the recovery of Pd, Tc, Rh and Ru fission product values as found in the aqueous acid nuclear fuel reprocessing waste solution resulting from the Purex Process reprocessing plant located at Hanford, Wash. This waste solution, commonly referred to as the 1WW Purex Plant Acid Waste Stream, is typically 4 to 5 $M$ in acid and contains small quantities of uranium, plutonium, neptunium, the rare earths, fission products such as Cs, Ce, Zr, La and metals from the fuel cladding such as Na, Fe, Al, Cr, Ni, Cd and Hg. One liter of this waste solution will also typically contain about 5.125 gm. Pd, 2.185 gm. Tc, 2.185 gm. Rh and 6.65 gm. Ru. It will contain a total of about 75 gm. of fission products and about 118 gm. of nonradioactive chemical impurities. Although the acidity of the 1WW solution is due to nitric acid, a feed solution of any strong mineral acid will be satisfactory.

The carbon having the chelating agent adsorbed thereon may be referred to as a carbon sorbate and acts as an ion exchanger in the hydrogen form. The preferred method of preparing the carbon sorbate is to dissolve the chelating agent in an appropriate volatile solvent such as, for example, ethyl alcohol, mix the resulting solution with the carbon to form a slurry and evaporate the solvent while stirring the slurry to form a sorbate which is superficially identical with the original carbon and will contain no surface film of reagent unless the intrinsic capacity of the carbon for the reagent has been exceeded. Another method is to dissolve the chelating agent in a solvent which need not be volatile, pass the solution through the bed of carbon and wash the solvent from the bed. It is preferred that the bed contain from about 20 to 25 w/o chelating agent. It is desirable to provide as much capacity on the bed as possible; however, too much chelating agent will result in a reagent wash-off rate which is high and could result in loss of fission product values. The carbon bed material may be any activated charcoal. If the sorbate is used in a fixed bed, granular carbon may be used; however, if a batch contact is preferred, the carbon may be crushed and screened to a size range of 16 to 48 mesh or smaller.

Although a number of chelating agents are satisfactory for the recovery of palladium, dimethylglyoxime (DMG) is specific for the chelation of palladium from an aqueous acid media and is therefore preferred. Acetylacetone and some of the dithiols are satisfactory for the chelation of technetium, such as diacetyltoluene-3,4-dithiol, and diacetyl dithiol (which is preferred). A number of agents will chelate both rhodium and ruthenium, such as 8-mercaptoquinoline or 8-hydroxyquinoline, although the most preferred agent is phenyl thiourea.

Although it is possible to elute the chelated elements from the carbon sorbate beds, it is easier and faster to recover the fission products from the carbon sorbate beds by calcining the bed in a closed system and leaching the values to be recovered from the resulting ash. The recovered values may then be readily purified and prepared for commercial use or, in the case of rhodium and ruthenium, encapsulated and sent to storage for the required period of time to permit proper decay of their radioactivity.

The preferred operating temperature is about 25° C. Although an increase in the temperature above this level would improve kinetics of the reaction, it would also reduce adsorption and enhance reagent washoff from the carbon. After passage of the feed solution through each carbon sorbate bed, the beds are washed with a water rinse to remove any feed solution which may adhere thereto.

EXAMPLE

The drawing is a simplified flow diagram of the process of the invention as it would be used to recover Pd, Tc, Rh and Ru values from the Hanford 1WW Purex Plant waste stream.

The carbon sorbate beds are prepared in an unshielded process area. The chelating agent is mixed in a small tank with sufficient ethyl alcohol to dissolve it, and the resulting solution is charged along with a sufficient quantity of activated carbon into a double-cone rotary vacuum dryer. After the carbon and solution are mixed, the alcohol is evaporated from the carbon and condensed for reuse. In this manner the three sorbate beds can be prepared using the same equipment. The amount of reagent necessary to prepare carbon sorbate beds of adequate size to process 2000 to 2500 liters of Purex waste stream per day is given in Table II below.

TABLE II

|      | Chelating agent (kg.) | Ethyl alcohol (kg.) | Carbon (kg.) |
|------|-----------------------|---------------------|--------------|
| DMG  | 11.2                  | 32.3                | 44.8         |
| DAD  | 11.3                  | 215.0               | 45.3         |
| PTU  | 65.0                  | 1236.0              | 260.0        |

The precious metal recovery takes place in a shielded, remotely operated process cell. In this cell a day's supply of liquid waste is pumped into the sorbate-waste contactor and the palladium-extracting sorbate is stirred in with the waste. After sufficient contact time, the waste is pumped to a holding tank while the loaded sorbate remains behind on a screen in the contactor. The sorbate is then slurried with rinse water and pumped to a porous metal or ceramic filter.

The filter containing the loaded sorbate is then transferred to a hooded furnace where the carbon is burned away. The ash is transported pneumatically to a final storage container. This procedure is repeated until all three sorbates contact the waste. The ash containing the ruthenium-rhodium is packaged and transferred to a shielded basin for 25-year storage. The other sorbate residues are destined for further decontamination and sale. Rinse water is recycled to avoid producing additional volumes of liquid waste which would alternately require evaporation.

It is expected that by this process about 99 percent of the palladium values will be recovered from the waste solution and that from about 75 to about 95 percent of the technetium and ruthenium and rhodium values will be recovered.

As can be seen from the above-described process and example, the invention relates to an effective method for the recovery of palladium, technetium, ruthenium and rhodium from aqueous acid waste reprocessing solutions and for the separation of palladium, technetium and ruthenium and rhodium values.

The embodiments of the invention in which an exclusive property or privilege is claimed are defined as follows:

I claim:

1. A method for recovering palladium, technetium, and rhodium and ruthenium values from an aqueous acid feed solution containing these and other values and from each other comprising: contacting the feed solution with a first bed of carbon, said bed having adsorbed thereon dimethylglyoxime, whereby only the palladium is chelated and is retained on the first bed, contacting the feed solution with a second bed of carbon, said second bed having adsorbed thereon a chelating agent selected from the group consisting of diacetyl dithiol and diacetyltoluene-3,4-dithiol, whereby only technetium is chelated and remains on the bed, contacting the feed solution with a third bed of carbon, said bed having adsorbed thereon a chelating agent selected from the group consisting of 8-mercaptoquinoline and phenylthiourea, whereby only the rhodium and ruthenium are chelated and remain on the bed, and recovering the values from the carbon beds.

2. The method of claim 1 wherein the chelating agent for technetium is diacetyl dithiol and the chelating agent for rhodium and ruthenium is phenylthiourea.

3. The method of claim 2 wherein the beds of carbon contain 20 to 25 weight percent chelating agent.

4. The method of claim 3 wherein the feed solution is 4 to 5 molar in acid.

5. The method of claim 4 wherein the bed of carbon containing the chelating agent is prepared by dissolving the chelating agent in a volatile solvent, mixing the dissolved chelating agent with the carbon and evaporating the solvent whereby the carbon has adsorbed thereon the chelating agent.

References Cited
UNITED STATES PATENTS

| | | | |
|---|---|---|---|
| 3,745,206 | 7/1973 | Holuska et al. | 423—22 |
| 3,420,709 | 1/1969 | Barrett et al. | 210—39 X |
| 3,473,921 | 10/1969 | Schmuckler | 75—121 X |
| 3,484,390 | 12/1969 | Bauman et al. | 75—118 UX |
| 2,371,119 | 3/1945 | Nachod | 423—22 X |
| 3,166,404 | 1/1965 | Hausman | 75—121 X |
| 3,672,875 | 6/1972 | MacCragh | 75—121 X |
| 3,694,370 | 9/1972 | Panesko | 423—22 X |

HERBERT T. CARTER, Primary Examiner

U.S. Cl. X.R.

75—101 BE; 210—39; 252—301.1 W; 423—49